(12) United States Patent
Waldstädt et al.

(10) Patent No.: US 9,706,780 B2
(45) Date of Patent: Jul. 18, 2017

(54) GUIDE DEVICE WITH A SEPARATED AXIAL AND RADIAL SUPPORT

(71) Applicant: Poly-clip System GmbH & Co. KG, Hattersheim (DE)

(72) Inventors: Manfred Waldstädt, Mainz (DE); Michael Theiβ, Altstadt (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 14/808,212

(22) Filed: Jul. 24, 2015

(65) Prior Publication Data

US 2016/0021900 A1 Jan. 28, 2016

(30) Foreign Application Priority Data

Jul. 25, 2014 (EP) .................................. 14178570

(51) Int. Cl.
*A22C 11/00* (2006.01)
*A22C 15/00* (2006.01)

(52) U.S. Cl.
CPC ............ *A22C 11/00* (2013.01); *A22C 15/001* (2013.01)

(58) Field of Classification Search
CPC .. A22C 11/02; A22C 11/0236; A22C 11/0216
USPC ........... 452/21–26, 30–32, 34–37, 46–48, 51
See application file for complete search history.

(56) References Cited

U.S. PATENT DOCUMENTS

| 3,209,398 | A | * | 10/1965 | Ziolko | ............... | A22C 13/0016 452/24 |
| 3,315,300 | A | * | 4/1967 | Ziolko | ............... | A22C 13/0006 264/40.1 |
| 3,397,069 | A | * | 8/1968 | Risany | ............... | A22C 13/0013 138/118.1 |
| 3,942,221 | A | * | 3/1976 | Sipusic | ................ | A22C 11/104 30/90.1 |
| 4,688,298 | A | * | 8/1987 | Mahoney | ............... | A22C 13/02 452/21 |

(Continued)

FOREIGN PATENT DOCUMENTS

DE 8802769 U1 4/1988
DE 20321618 U1 6/2008

(Continued)

OTHER PUBLICATIONS

Extended European search report issued in the related European Application No. 14178570.9 dated Jan. 16, 2015 (6 pages).

*Primary Examiner* — Richard Price, Jr.
(74) *Attorney, Agent, or Firm* — Fitch, Even, Tabin & Flannery LLP

(57) ABSTRACT

The present invention relates to a guide device for guiding a suspension element, like a loop, being attached to one end of a sausage-shaped product, like a sausage, from a first apparatus, like an apparatus for producing sausage-shaped products, in a guide direction to a second apparatus, like a handling device for said sausage-shaped products. The guide device comprises a guide unit for guiding the suspension element and support means for radially and axially supporting the guide unit. According to the present invention, the support means comprise a first support unit and a second support unit for a functional separation of the axial support and the radial support of the guide unit.

20 Claims, 7 Drawing Sheets

(56) References Cited

U.S. PATENT DOCUMENTS

| | | | | |
|---|---|---|---|---|
| 4,914,784 | A | * | 4/1990 | Nausedas ........... A22C 11/0227 452/34 |
| 6,855,047 | B2 | * | 2/2005 | Shefet .................. A22C 15/001 452/32 |
| 6,866,573 | B2 | * | 3/2005 | Shefet .................. A22C 15/001 452/32 |
| 8,808,067 | B2 | * | 8/2014 | Waldstadt .............. A22C 11/00 452/51 |
| 8,911,284 | B2 | * | 12/2014 | Waldstadt .............. A22C 11/00 452/51 |
| 2008/0064313 | A1 | | 3/2008 | Topfer |

FOREIGN PATENT DOCUMENTS

| | | |
|---|---|---|
| EP | 0746517 A1 | 12/1996 |
| EP | 2572585 A1 | 3/2013 |

* cited by examiner

GUIDE DEVICE WITH A SEPARATED AXIAL AND RADIAL SUPPORT

CROSS-REFERENCE TO RELATED APPLICATION

The present application claims the benefit of priority of European Patent Application No. 14178570.9 filed 25 Jul. 2014, the contents of which are incorporated herein by reference in their entirety.

FIELD

The present invention relates to a guide device for guiding a suspension element, like a loop, being attached to one end of a sausage-shaped product, from a first apparatus to a second apparatus, according to claim 1.

In particular, the present invention relates to a guide device for guiding a suspension element, like a loop, which is attached to one end of a sausage-shaped product, like a sausage, in a guide direction, from a first apparatus, like an apparatus for producing sausage-shaped products, to a second apparatus, like a handling device for said sausage-shaped products, the guide device comprises a guide unit for guiding the suspension element and support or bearing means for radially and axially supporting or bearing the guide unit.

BACKGROUND

In the practice, it is known that, for example in the production of sausage-shaped products, like sausages, a filling material is fed by a filling machine in a feeding direction through a filling tube of a clipping machine into a tubular casing material which is stored on the filling tube and which is closed at its front end, referred to the feeding direction, by a closing clip. The tubular casing material is pulled-off from the filling tube while being filled. After a predetermined volume of filling material is filled into said tubular casing material, a displacement device with a first and a second pair of displacement elements forms a plait-like portion of the tubular casing material and the clipping machine places and closes at least one closing clip at the plait-like portion forming the back end of the sausage-shaped product by respective closing tools which are reversibly movable towards the plait-like portion. In the case that the sausage-shaped product has to be hung up, e.g. for further treatment, a suspension element, like a suspension loop, is attached to the sausage-shaped product together with one of the closing clips. Thereafter, the sausage-shaped product just produced, is separated from the remaining casing material by a knife or the like of a cutting device of the clipping machine and is transferred to a storage device or another machine for further treatment.

From DE patent 38 06 467, an apparatus for producing and transferring sausages to a storage device, in particular to a smoking rod, is known. A device for discharging the sausage just produced out of a clipping machine and transferring said sausage to the smoking rod includes a sword being part of a guide device of said known apparatus and having a first or tip end directed towards the clipping machine for catching the suspension loop attached to said sausage, as well as a second end opposite to the tip end. Moreover, there is provided a chain conveyor for transferring the sausages hanging on the sword to a smoking rod. A belt conveyor carries the sausage just produced out of the clipping machine, whereby the suspension loop is shifted along the sword. For holding the sword in position, and for enabling the suspension loop passing the sword, said sword is held by pistons laterally engaging the sword. For allowing the suspension loop to pass the pistons, said pistons can alternately be disengaged from the sword.

For a trouble-free operation, a complex control of said apparatus is necessary since the movement of the pistons has to be coordinated with the transportation speed of the belt conveyor and the production rate of the clipping machine. Moreover, said pistons may not be moved at a high speed, thereby limiting the maximum production rate of the clipping machine.

SUMMARY

Thus, it is an object of the present invention to provide a guide device for guiding a suspension element, with which the above mentioned drawbacks can be overcome, and which enables a safe transfer or transportation of the suspension elements and of said sausage-shaped products, respectively.

The aforesaid object is achieved by the features of claim 1. Advantageous configurations of the guide device are described in claims 2 to 15.

According to the present invention, there is provided a guide device for guiding a suspension element, like a loop, being attached to one end of a sausage-shaped product, like a sausage, from a first apparatus, like an apparatus for producing sausage-shaped products, in a guide direction to a second apparatus, like a handling device for said sausage-shaped products. The guide device comprises a guide unit for guiding the suspension element and support means for radially and axially supporting the guide unit.

In an advantageous embodiment of the inventive guide device, the support means comprise a first support unit and a second support unit for separating functionally or a functional separation, respectively, of the axial support and the radial support of the guide unit. The separation of the functionality of radial and axial supporting enables an improvement of both functions, whereby the separate support units may have a simplified design. Moreover, by separating the axial and radial support or bearing, respectively, of the guide unit, a greater flexibility with regard to the length of the guide unit can be achieved. If the guide unit has a great length, the axial support and the radial support can be arranged in a great distance whereas, if the guide unit has a short length, the axial and radial support can be arranged close to each other.

According to a further advantageous embodiment, the guide unit comprises at least one longitudinally extending guide means including at least a first guide portion, and the first support unit comprises at least first conveyor means for engaging at least the first guide portion of the guide means for radially supporting or to radially support the guide unit. The first conveyor means provide a support surface for securely supporting the first guide portion of the guide means. Dependent on the size and/or the weight of the guide means, the size of the conveyor, like its length, and thus, its support surface for the first guide portion may be varied, increased or decreased, respectively.

In a preferred configuration, the first conveyor means comprise at least an endless conveyor element, like a belt or chain, extending longitudinally in the guide direction and supporting the first guide portion of the guide means by its load strand. A conveyor including an endless conveyor element may continuously be driven thereby providing constant support conditions, or may intermediately be driven, i.e. only if a loop of a sausage-shaped product has to be guided.

For preventing the first guide portion of the guide means from radially moving away from the load strand of the first conveyor means, a pusher element may be provided, which in the simplest case may be a wheel bearing on the first guide portion.

For an improved support of the first guide portion of the guide means, in a further preferred configuration, the first support unit includes second conveyor means being arranged opposite to the first conveyor means, and comprising at least an endless conveyor element extending longitudinally in the guide direction and supporting the first portion of the guide means by its load strand. The first portion of the guide means, in this configuration, is supported between the load strands of the endless conveyor elements of the first and second conveyor means, thereby, radial movement of the guide means, and particularly, of the first guide portion, is omitted, at least in the direction towards the first and second conveyor means.

For providing additional support of the first guide portion, the first guide portion of the guide means has at least partially a concave shape, and the load strand of the endless conveyor element of the first conveyor means and/or the second conveyor means at least partially extends along a corresponding convex curve for engaging the first guide portion of the guide means. To increase the support, it may be sufficient that only one of the load strands of the endless conveyor elements of the first conveyor means or the second conveyor means at least partially extends along a corresponding convex curve and engages the concave shape of the first guide portion. Naturally, the first guide portion may be provided with said concave shape at both sides facing towards the first and second conveyor means, and may be engaged by the convex shaped load strands of the endless conveyor elements of the first and the second conveyor means.

Alternatively or additionally to the concave shape of the guide means and the corresponding convex shape of the load strands of the first conveyor means and/or the second conveyor means, the guide means may be designed such that the load strand of the endless conveyor element of the first conveyor means and/or the second conveyor means together with a respective portion of the wheels about which the endless conveyor elements are guided, are accommodated in respective recesses for providing an axial support in the guide direction. Said recesses may be formed by the concave-shaped surface portions of the guide means, which at their ends in guide direction and contrary thereto, at least partially surround the wheels of the conveyor means, about which the endless conveyor element is wound. Thereby, the conveyor means are supported by the ends of the concave-shaped surface portions of the guide means in guide direction. This solution can be used independently from the foregoing or the following technical teachings.

For further increasing the support function and for preventing the first guide portion, and thus, the guide means, from movement in a radial direction and laterally to the first and second conveyor means, the endless conveyor element of the first conveyor means and/or the second conveyor means has at least a groove or a notch extending along its outer surface at least approximately in the guide direction, and the first guide portion of the guide means comprises a matching notch or groove extending along the surface facing towards the endless conveyor element of the first conveyor means and/or the second conveyor means.

It has to be understood that the first and second conveyor means are provided with a respective drive for separately or commonly driving the first and second conveyor means. Furthermore, it is preferred that the first and second conveyor means are driven at the same speed for enabling a safe transport of the suspension element. It has also to be understood that the speed of the first and second conveyor means may be varied, e.g. depending on the production or transportation speed or product size. For controlling the speed of the first and second conveyor means a control device can be provided. This control device can be connected to at least one further control unit of at least one of the apparatus between which the inventive guide device is provided for being able to have an inter-coordinated control of each of the apparatus and the guide device.

According to an advantageous configuration, the second support unit for axially supporting the guide unit is positioned spaced apart from the first support unit. This design allows adjusting the length of the guide means in accordance with the length of the sausage-shaped products which are transported and guided along the guide device. The guide unit thereby remains stabile since it is securely supported by two support units.

In an advantageous embodiment, the guide means comprise at least a second guide portion, and the second support unit comprises at least a first supporting assembly including at least one supporting element which engages the second guide portion of the guide means. The second support unit thereby enables a safe support of the guide means in axial direction.

For further enhancing the axial support of the guide means, the first supporting assembly includes a second supporting element positioned spaced apart from the first supporting element in the guide direction, which engages the second guide portion of the guide means.

According to a preferred embodiment of the inventive guide device, the first supporting assembly comprises a rocker lever coupled to the first and the second supporting element, for alternately driving the first and the second supporting element. Thereby, the first and second supporting elements may successively engage and disengage the second guide portion of the guide means for enabling the passage of a suspension element in the guide direction.

It is further preferred that the second support unit comprises a switch for actuating the rocker lever. Thereby, the engagement and disengagement of the first and the second supporting element may be controlled. Such control may ensure that, at any time, at least one of the first and second supporting elements is in engagement with the second guide portion, providing a permanent axial support.

The switch for actuating the rocker lever, or the lever drive, respectively, may be activated directly when coming in contact with a suspension element guided along the guide means, or indirectly, e.g. by means of a light barrier detecting a suspension element on a respective position when guided along the guide means.

The rocker lever is a two-arm lever. The two arms of the rocker lever may have the same length. Preferably, the arms of the rocker lever are of different length for further securing that at any time at least one of the first and second supporting elements is in engagement with the second guide portion. Further preferably, the lever arm facing in the guide direction is shorter than the lever arm facing in the direction contrary to the guide direction.

It has to be understood that the first and the second supporting elements are guided in linear guidance for enabling a correct engagement and disengagement in the second guide portion.

Generally, the first supporting assembly of the second support unit may be positioned in any radial orientation relative to the second guide portion. It has only to be ensured that the first and second supporting elements are radially oriented for successive engagement and disengagement of the second guide portion. In a preferred embodiment, the first supporting assembly is positioned at least approximately perpendicular to the guide direction and spaced apart from the second guide portion of the guide means. In a preferred embodiment, the first supporting assembly is positioned at least approximately vertically above the second guide portion of the guide means. In this case, an additional support below the second guide portion is necessary, which, in a simple case, may be realized by a wheel supporting the lower surface of the second guide portion of the guide means.

The second support unit advantageously comprises a second supporting assembly positioned opposite to the first supporting assembly and including at least one spacer element, and the second guide portion of the guide means includes at least one spacer element co-acting with the at least one spacer element of the second supporting assembly, for keeping the second guide portion of the guide means spaced apart from the second supporting assembly. In this configuration, the second guide portion, and thus, the guide means, is sufficiently supported, and a safe passage of the suspension element to be guided, is ensured.

The spacer elements may be designed in different ways. Preferably, the at least one spacer element of the second supporting assembly and the at least one spacer element of the second guide portion of the guide means are magnetic elements having contrarily directed polarity. Such spacer elements push one another in opposite direction, whereby a space between the second guide portion and the second supporting assembly is provided, enabling the passage of the suspension element.

Magnetic spacer elements may be provided in the form of permanent magnets encapsulated in the second guide portion, e.g. in recesses or cavities in the second guide means. Naturally, also the second guide portion itself may be made of a magnetic material. Magnetic spacer elements may also realized by electromagnetism, e.g. by a current fed to conductor element, or via electromagnetic induction.

Alternatively to the provision of spacer elements which functionally base on magnetism, second supporting assembly may comprise spacer elements realizing other principles, e.g. a fluid flow may be provided, carrying the second guide portion. Pressurized air, as the fluid, may be provided via a respective nozzle, as one of the spacer elements.

According to a further advantageous embodiment of the guide device of the present invention, a third support unit is provided spaced apart from the first and second support units in the guide direction, wherein the third support unit includes at least one spacer element co-acting with a further spacer element of the guide means. By means of such a third support unit the axial length of the guide device may be increased. Alternatively, an additional guide segment may be added to the guide means, which may be aligned in a direction different from the longitudinal extension of the guide means, i.e. in a second guide direction.

In the following, further advantages and embodiments of the inventive guide means are described in conjunction with the attached drawings. Thereby, the expression "left", "right", "below" and "above" are referred to the drawings in an orientation of the drawings which allows the normal reading of the reference numbers.

DETAILED DESCRIPTION

Figure 1:
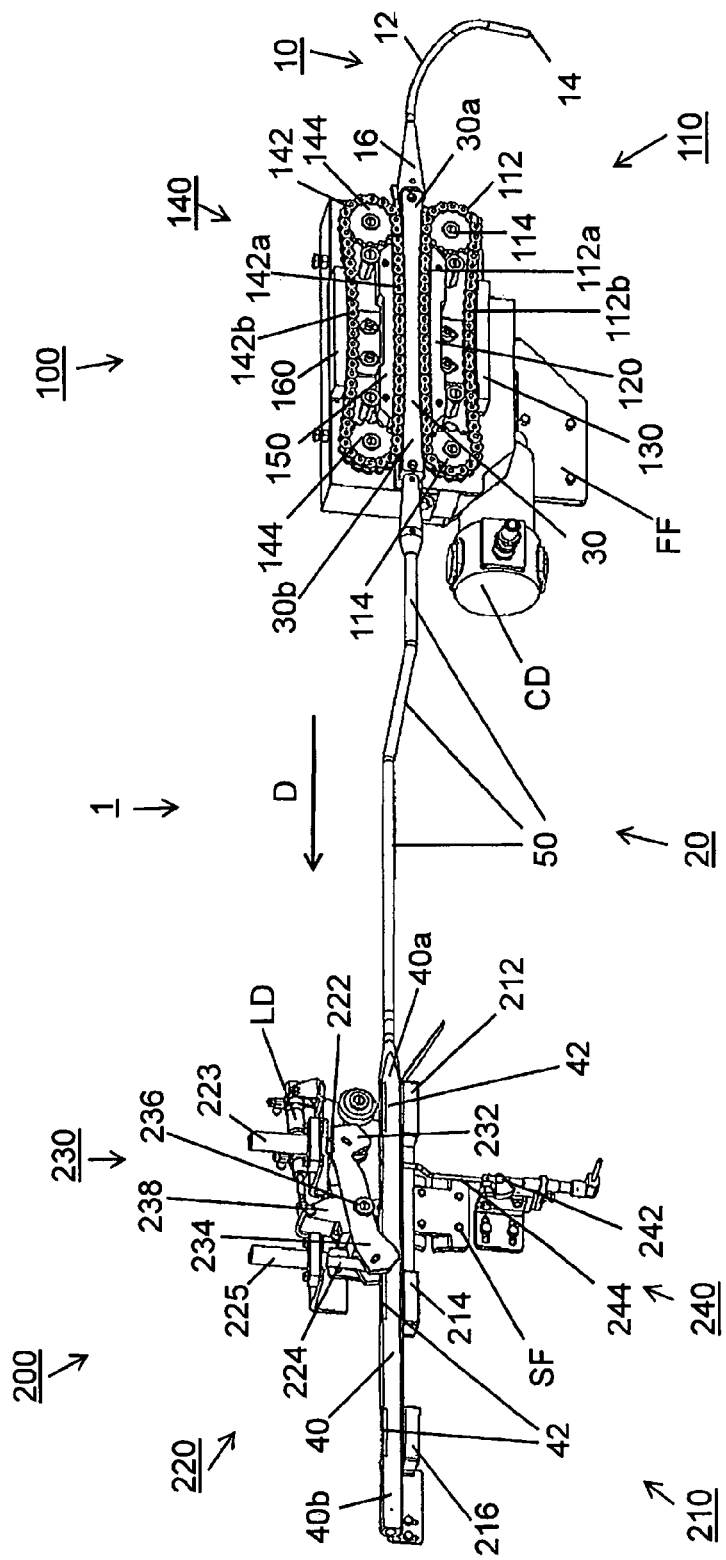
FIG. 1 is a perspective and schematic view of a first embodiment of a guide device according to the present invention.

FIG. 1 is a perspective and schematic view of a first embodiment of a guide device 1 according to the present invention.

The guide device 1 according to FIG. 1 comprises a guide unit 20, a first support unit 100 and a second support unit 200. The guide device 1 is used for guiding a suspension element, like a loop, being attached to a sausage-shaped product, like a sausage, from one apparatus, like a clipping machine (not shown), to another apparatus, like a handling device for that sausage-shaped products (not shown), in a guide direction D. A catching device 10 is attached to the free end of guide unit 20, which, according to FIG. 1, is the right end of guide unit 20. In this case, the guide device 1 may be used for discharging sausages from a clipping machine.

Guide unit 20 includes a longitudinal extending guide means comprising a first guide portion 30 having a first end 30a and a second end 30b, a second guide portion 40 having a first end 40a and a second end 40b, and connecting rods 50 which are arranged between first guide portion 30 and second guide portion 40. Guide unit 20 is at least approximately arranged in the guide direction D, with first guide portion 30 facing in a direction contrary to the guide direction D, e.g. towards a clipping machine, and the second guide portion 40 facing in guide direction D, e.g. away fro the clipping machine, and at least approximately towards a handling device.

Catching device 10 has a generally curved portion 12 with a first or free end 14 and a second or attachment end 16, and is coupled to first end 30a of first guide portion 30 facing towards the clipping machine.

Connecting rods 50 connect second end 30b of first guide portion 30 to first end 40a of second guide portion 40. In the shown embodiment, three connecting rods 50 form an at least approximately vertical arranged step for bridging a difference in height between first support unit 100 and second support unit 200. It has to be understood that, in case that no difference in height has to be bridged, only one connecting rod 50 is necessary for connecting second end 30b of first guide portion 30 to first end 40a of second guide portion 40.

First support unit 100 includes a first conveyor means 110, a second conveyor means 140 and a conveyor drive CD for driving first and second conveyor means 110, 140. First support unit 100 further includes a first frame work FF to which the components of first support unit 100 are mounted, and by means of which first support unit 100 may be mounted to the frame of a production assembly for producing and handling sausage-shaped products. In a simple case, first support unit 100 may be mounted by frame work FF to a clipping machine for ensuring a correct positioning of guide device 1, relative to the clipping machine.

First conveyor means 110 are realized by a first chain conveyor. First conveyor means or first chain conveyor 110 comprises an endless conveyor element or endless chain 112 including chain links 113, which is guided around two tooth wheels 114 (cf. FIG. 2). The axis of toothed wheels 114 are arranged at least approximately horizontally and at least proximately vertically to guide direction D. Tooth wheels 114 are arranged in guide direction D. Endless chain 112 thereby forms an upper run or load strand 112a and a lower run or return strand 112b, which are aligned approximately parallel to each other and which are arranged at least approximately in guide direction D. An upper chain guide 120 is arranged between toothed wheels 114 and supports the inner side of load strand 112a of endless chain 112. Upper chain guide 120 has a convex outer surface which contacts load strand 112a of endless chain 112 which is thereby guided on a convex pathway. A lower chain guide 130 is positioned below return strand 112b of endless chain 112. Lower chain guide 130 has a convex shaped surface facing towards return strand 112b and providing a concave pathway for guiding return strand 112b which is thereby brought into a concave shape.

Second conveyor means 140 are realized by a second chain conveyor. Second conveyor means or second chain conveyor 140 comprises an endless conveyor element or endless chain 142 including chain links 143, which is guided around two tooth wheels 144. The axis of toothed wheels 144 are arranged at least approximately horizontally and at least proximately vertically to guide direction D. Tooth wheels 144 are arranged in guide direction D. Endless chain 142 thereby forms a lower run or load strand 142a and an upper run or return strand 142b, which are aligned approximately parallel to each other and which are arranged at least approximately in guide direction D. A lower chain guide 150 is arranged between toothed wheels 144 and supports the inner side of load strand 142b of endless chain 142. Lower chain guide 150 has a convex outer surface which contacts load strand 142a of chain 142 which is thereby guided on a convex pathway. An upper chain guide 160 is positioned above return strand 142b of endless chain 142. Upper chain guide 160 has a convex shaped surface facing towards return strand 142b and providing a concave pathway for guiding return strand 142b which is thereby brought into a concave shape.

Figure 3:
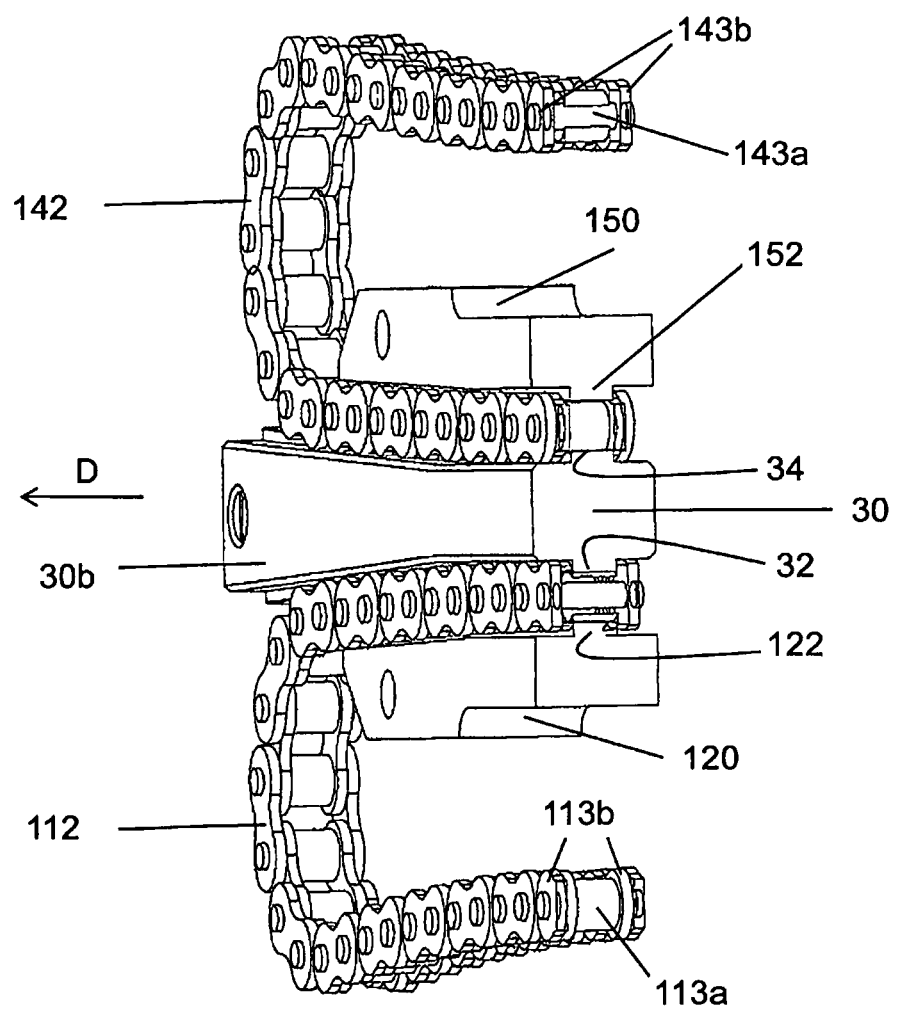
FIG. 3 is a perspective view to a cross-sectional cut out of the conveyor means of the first support unit according to the present invention.

As it can be seen in FIGS. 1 and 3, first guide portion 30 is positioned between load strand 112a of endless chain 112 and load strand 142b of endless chain 142, and has an upper and a lower surface having concave shapes matching the convex shape of load strand 112a of endless chain 112 and load strand 142b of endless chain 142. Thereby, upper and lower surfaces of first guide portion 30 come into direct contact with load strand 112a of endless chain 112 and load strand 142b of endless chain 142, respectively.

Second support unit 200 is arranged in the region of second guide portion 40 of guide means 20. Second support unit 200 comprises a first or upper supporting assembly 220 which includes a first, vertically arranged supporting element or support pin 222 guided in a first vertical guidance 223, and a second vertically arranged supporting element or support pin 224 guided in a second vertical guidance 225.

Vertically below first or upper supporting assembly 210, a second or lower supporting assembly 210 is arranged, including a first spacer element 212 and a second spacer element 214, which are arranged at least approximately horizontally and successive in guide direction D. A third spacer element 216 is arranged successive to first and second spacer elements 212, 214 in guide direction D.

Supporting elements or support pins 222, 224 and vertical guidance 223, 225 of first or upper supporting assembly 220 are arranged successive in guide direction D, and such that first and second support pins 222, 224 are positioned between first and second spacer elements 212, 214.

Upper supporting assembly 220 further comprises a rocker lever 230 which is arranged between first and second support pins 222, 224. Rocker lever 230 is a two-arm lever having a first arm 232, a second arm 234 and a pivot 236 between arms 232, 234 about which rocker lever 230 may be pivoted by a lever drive LD. Rocker lever 230 is coupled to support pins 222, 224 by the free ends of its arms 232, 234. The free end of first arm 232 is connected to first support pin 222, and the free end of second arm 234 is coupled to second support pin 224. Support pins 222, 224 are attached to arms 232, 234 of rocker lever 230 by securing pins which extend trough support pins 222, 224 and which are supported in elongated holes in arms 232, 234 of rocker lever 230 for enabling linear movement of pins 222, 224 during pivotal movement of rocker lever 230. Rocker lever 230 has a protrusion 238 extending upwardly and vertically from rocker liver 230 in a direction at least approximately vertically to guide direction D. Protrusion 238 is coupled to lever drive LD, which in the shown embodiment, is a piston/cylinder drive.

Figure 4:
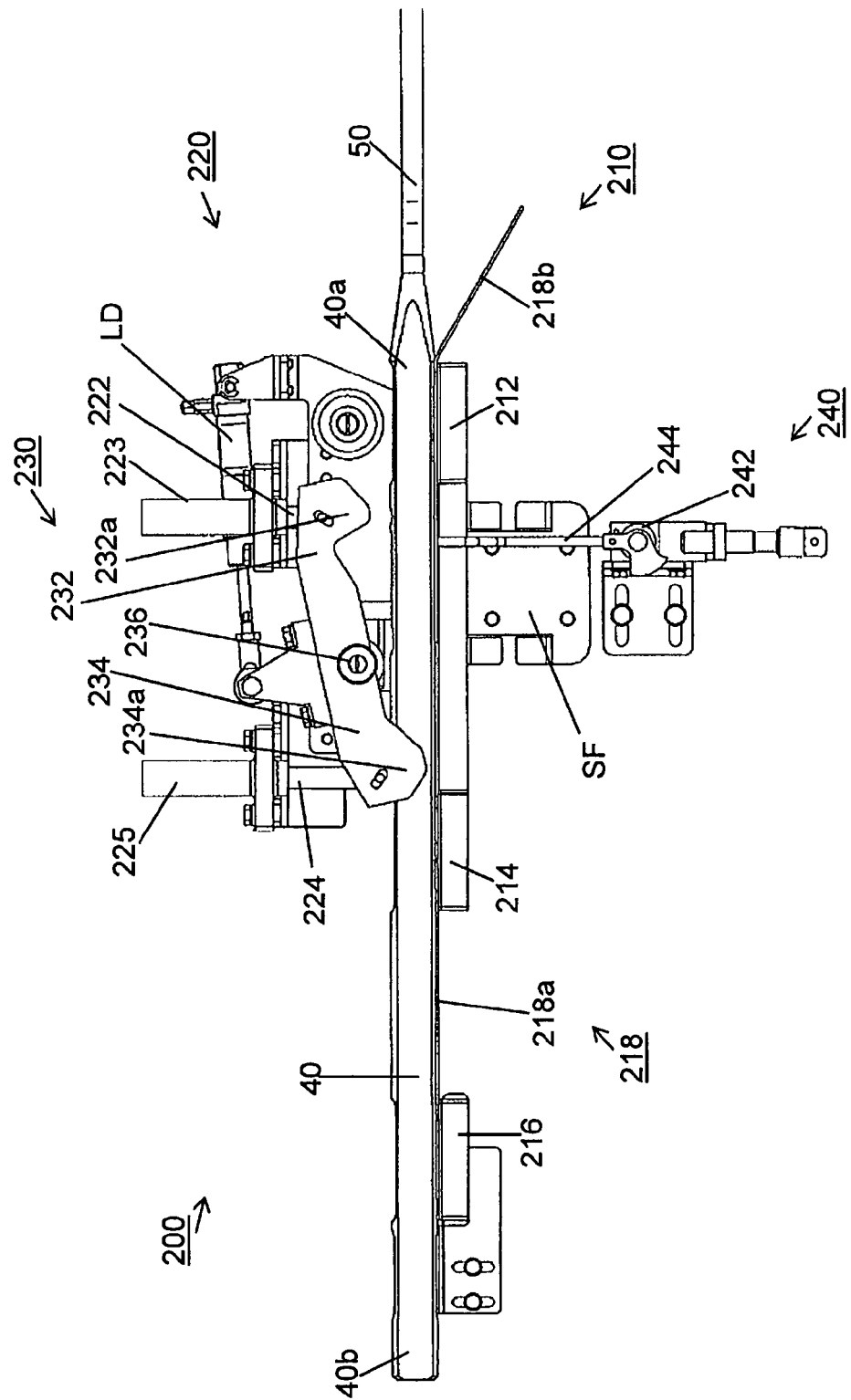
FIG. 4 is a schematic view of the second support unit of the guide device according to FIG. 1.
Figure 5:
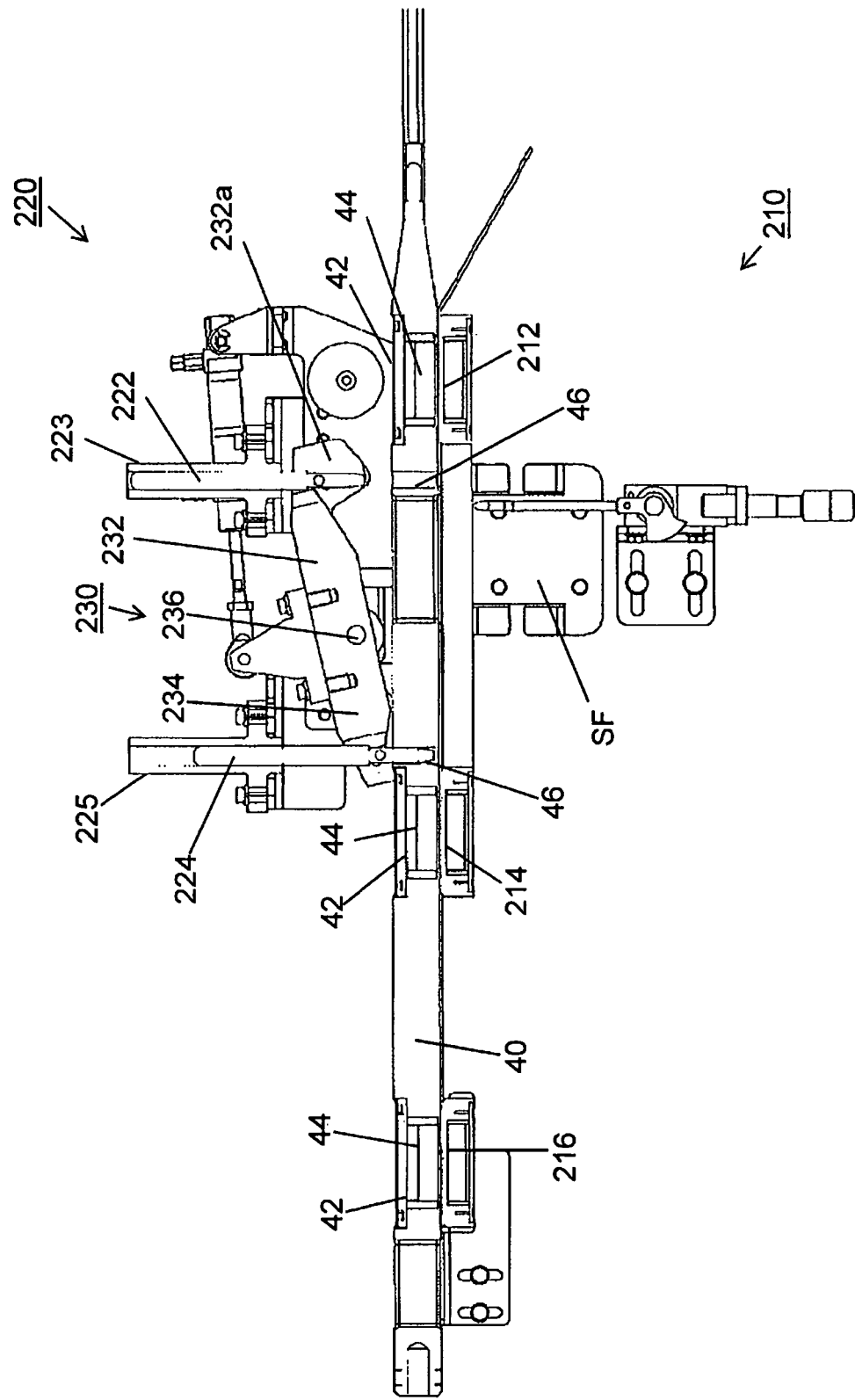
FIG. 5 is a cross-sectional view to the second support unit of the guide device according to FIG. 4.

In the situation shown in FIGS. 1, 4 and 5, rocker lever 230 is in a first position in which rocker lever 230 is pivoted counterclockwise in guide direction D such that first supporting element or first pin 222 is out of engagement with second guide portion 40, and in which second supporting element or second support pin 224 is in engagement with second guide portion 40.

Second support unit 200 comprises a second frame work SF on which its components are mounted.

Second guide portion 40 is positioned between lower supporting assembly 210 and upper supporting assembly 220, extends in guide direction D, and exceeds second support unit 200 with its second end 40b in guide direction D.

Vertically below first and second supporting elements or support pins 222, 224, vertically extending holes are arranged in second guide portion 40, the diameter of which corresponds to the diameter of support pins 222, 224, for enabling support pins 222, 224 to engage into said holes.

Second guide portion 40 further comprises three recesses 42 for accommodating spacer elements 44, like permanent magnetic elements. Each of the recesses 42 is arranged such that it is positioned vertically above spacer elements 212, 214, 216 of lower supporting assembly 210.

As it can be seen in FIG. 4, second support unit 200 further comprises a switch 240 arranged below lower supporting assembly 210, for actuating rocker lever 230 or its drive LD, respectively. Switch 240 has a switch element 242 and an actuating element 244. Actuating element 244 is an at least approximately vertically arranged pin which extends through the space between lower supporting assembly 210 and into a recess in second guide portion 40, such that a suspension element guided along second guide element 40, pivots actuating element or switch pin 244 in guide direction D, thereby actuating lever drive LD of rocker lever 230.

Figure 2:
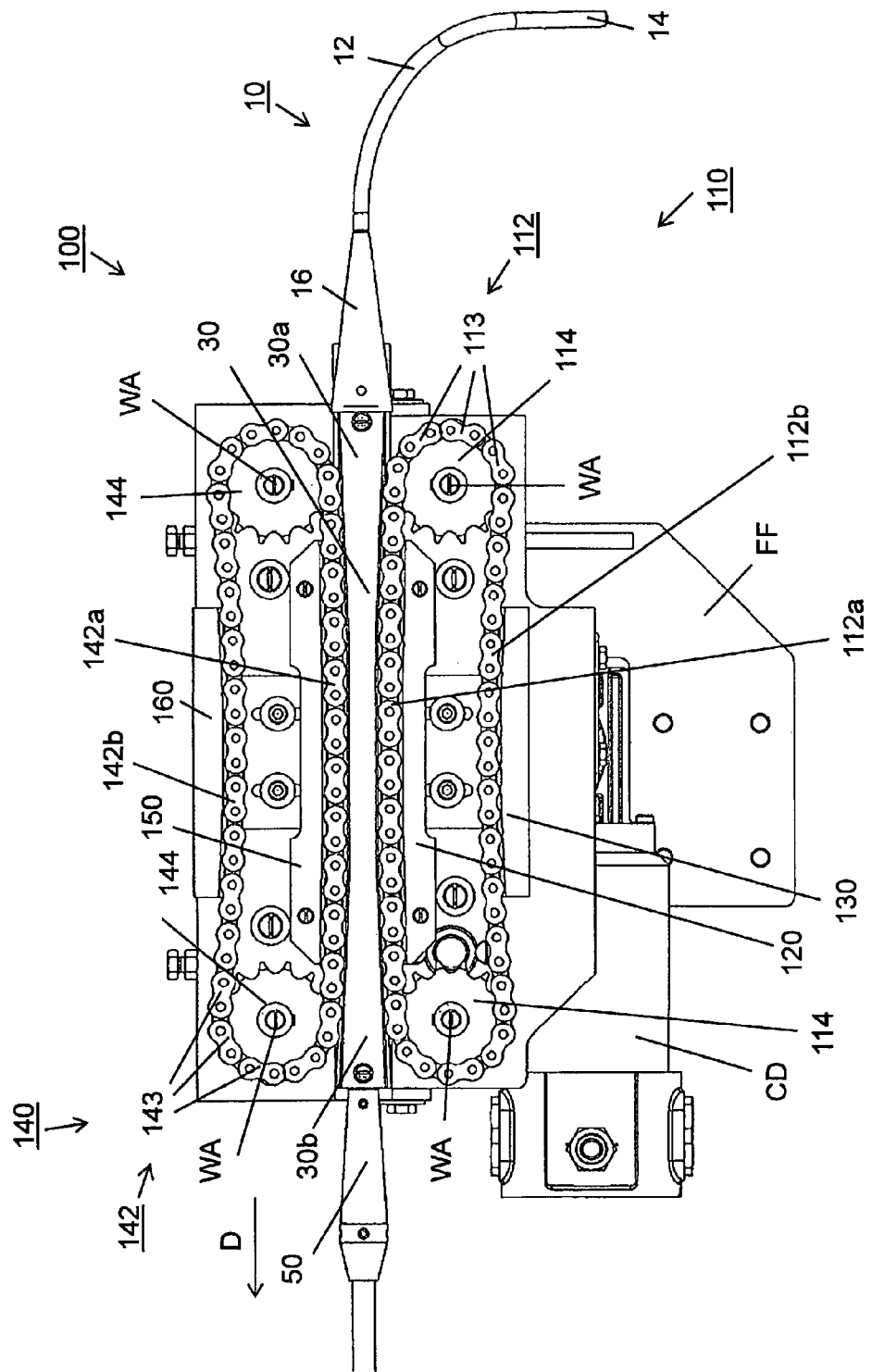
FIG. 2 is a schematic view of the first support unit of the guide device according to FIG. 1.

FIG. 2 shows a schematically view of first support unit 100 of the guide device 1 according to FIG. 1.

As already explained in conjunction with FIG. 1, first chain conveyor 110 comprises endless chain 112 which consists of chain links 113, and which is guided around toothed wheels 114. The axis WA of toothed wheels 114 are arranged at least approximately horizontally and aligned approximately rectangular to guide direction D. Upper side of upper chain guide 120 arranged between toothed wheels 114, has a convex outer surface which contacts load strand 112a of endless chain 112 and guides load strand 112a of endless chain 112 on a convex pathway. Lower chain guide 130 positioned below return strand 112b of endless chain 112, has a convex shaped upper surface facing towards return strand 112b, guiding return strand 112b on a concave pathway.

Second chain conveyor 140, as explained in conjunction with FIG. 1 and as it can be seen in FIG. 2, is designed approximately identically to first chain conveyor 120, but mirror imaged. That means, endless chain 142 of second chain conveyor 140, guided around toothed wheels 144, forms a lower run or load strand 142a and an upper run or return strand 142b. Load strand 142a of chain 142 is thereby guided on a convex pathway by lower chain guide 150 which is arranged between toothed wheels 144, and which has a convex lower surface contacting load strand 142a of endless chain 142.

As it can be seen in FIG. 2, first guide portion 30 is positioned between load strand 112a of endless chain 112 and load strand 142b of endless chain 142, such that first guide portion 30 extends approximately in guide direction D, with first end 30a directed contrary to guide direction D, and with second end 30b directed in guide direction D. The lower surface of first guide portion 30 has a concave shape matching the convex shape of load strand 112a of endless chain 112. The upper surface of first guide portion 30 has a concave shape matching the convex shape of load strand 142a of endless chain 142.

In the embodiment of FIGS. 1 and 2, first portion has an axial length which is approximately equal to the length of first and second chain conveyors 110, 140, and the concave shapes of the upper and lower surfaces of first guide portion 30 extend over the entire length of first guide portion 30, whereby first guide portion 30 is supported by first support unit 100 over its entire length. Naturally, first guide portion may also have a length different from the length of first and second chain conveyors.

As it further can be seen in FIG. 2, at first end 30a of first guide portion 30, catching device 10 is attached by its first end, and at second end 30b of first guide portion 30, a connecting rod 50 is attached.

FIG. 3 is a perspective view to a cross-sectional cut out of first and second conveyor means 110, 140 of first support unit 100. In this specific view, only first guide portion 30, endless chains 112, 142, upper chain guide 120 of first chain conveyor 120 and lower chain guide 150 of second chain conveyor are shown.

As it can be seen in FIG. 3, first guide portion has an approximately rectangular cross section. On its lower surface facing towards load strand 112a of endless chain 112, a notch 32 is arranged, extending approximately over the entire length of first guide portion 30. Notch 32 has an approximately rectangular cross section. On the upper surface of first guide portion 30, a further notch 34 is arranged, extending approximately over the entire length of first guide portion 30. Also notch 34 has an approximately rectangular cross section.

Upper chain guide 120 has an approximately rectangular cross section. A notch 122 having an approximately rectangular cross section, extends over its upper surface in guide direction D. A notch 152 extends over the lower surface of lower chain guide 150, in guide direction D. Lower chain guide 150 and notch 152 have approximately rectangular cross sections.

Endless chains 112, 142, consist of chain links 113, 143. Each chain link 113, 143 has a pair of cylindrical rollers 113a, 143a and a pair of planar side walls 113b, 143b extending over rollers 113a, 143a. At each chain 112, 142, thereby a first or inner groove 112c, 142c facing towards upper chain guide 120 and lower chain guide 150, and an outer or second groove 112d, 142d facing towards first guide portion 30, are formed.

As it can be seen in FIG. 3, notches 32, 34 of first guide portion 30 engage into first grooves 112c, 142c of endless chains 112, 142, and notches 122, 152 of upper chain guide 120 of first conveyor 110 and lower chain guide 150 of second conveyor 140 engage into second grooves 112d, 142d of endless chains 112, 142. Notches 112, 152 thereby guiding load strands 112a, 142a of endless chains 122, 142 in guide direction D. Second grooves 112d, 142d facing towards first guide portion 30, supporting first guide portion 30 in lateral directions.

FIG. 4 is a schematically view of second support unit 200 of guide device 1.

Second support unit 200 comprises lower supporting assembly 210 including first and second spacer elements 212, 214. First and second spacer elements 212, 214 are arranged at least approximately horizontally and successive in guide direction D. Third spacer element 216 is arranged successive to first second spacer element 212, 214 in guide direction D.

An approximately horizontally arranged guide plate 218 extends in guide direction D between spacer elements 212, 214, 216 and second guide portion 40, providing a guide path immediately below second guide portion 40, for enabling passage of a suspension element. Guide plate 218 has a first portion 218a and a second portion 218b. First portion 218a of guide plate 218 is aligned parallel to second guide portion 40. Second portion 218b of guide plate 218 extends from the right end of first portion 218a towards first guide portion 30, and is angled downwards, to enable guidance of a suspension element into the guide path between lower supporting assembly 210 and second guide portion 40.

Upper supporting assembly 220 arranged vertically above lower supporting assembly 210, includes first and second supporting elements or first and second support pins 222, 224 which are guided in first and second vertical guidance 223, 225. Support pins 222, 224 and vertical guidance 223, 225 are arranged successive in guide direction D, and such that first and second support pins 222, 224 are positioned between first and second spacer elements 212, 214, with first support pin 222 closer to first spacer element 212, and with second support pin 224 closer to second spacer element 214. In this configuration, second guide portion 40 is supported at any time from below by first and second spacer elements 212, 214, and by at least one of support pins 222, 224 from above and between first and second spacer elements 212, 214, providing a stable support of second guide portion 40.

FIG. 5 is a cross-sectional view to second support unit 200 of guide device 1 according to FIG. 4.

Second guide portion 40 comprises three recesses 42 for accommodating spacer elements 44. Each of the recesses 42 is arranged such that it is positioned vertically above one of spacer elements 212, 214, 216 of lower supporting assembly 210.

As it particularly can be seen in FIG. 5, vertically below first and second support pins 222, 224, vertically extending holes 46 are arranged in second guide portion 40, the diameter of which corresponds to the diameter of support pins 222, 224, for enabling support pins 222, 224 to engage into holes 46.

Rocker lever 230 is approximately horizontally arrange between first and second support pins 222, 224, and may be pivoted by lever drive LD about pivot 236 arranged between first and second arms 232, 234. Rocker lever 230 is coupled to support pins 222, 224 by the free ends of its arms 232, 234, for vertically moving support pins 222, 224.

Furthermore, as it can be seen in FIGS. 4 and 5, rocker lever 230 is designed such that the lower ends of support pins are covered by respectively shaped side wall elements 232a, 234a arranged at the free ends of lever arms 232, 234. At each free end of arms 232, 234, a pair of side wall elements 232a, 234a is arranged such that, when the respective free end is moved downwardly, the corresponding pair of side walls 232a, 234a passes second guide portion 40 on its left and right side. Thereby, a suspension element passing a free end of a lever arm 232, 234 is prevented from engaging the lower end of support pin 222, 224.

As it further can be seen in FIG. 5, arm 232 of rocker lever 230 is longer than arm 234. Accordingly, when pivoting rocker lever 230 from the first position, shown in FIGS. 1, 4 and 5, into a second position in which rocker lever 230 is pivoted in clockwise direction such that first support pin 222 is in engagement with second guide portion 40 and second support pin 224 is out of engagement with second guide portion 40, the moving path of free end of arm 232, and thus, the moving path of the lower end of first support pin 222, is longer than the moving path of the free end of arm 234, and the moving path of the lower end of second support pin 234, respectively. This specific design enables that, when pivoting rocker lever 230 from the first position into the second position, first support pin 222 engages second guide portion 40 before second support pin 224 disengages second guide portion 40. Accordingly, when rocker lever 230 is pivoted back into the first position, second support pin 224 engages second guide portion 40 before first support pin 222 disengages second guide portion 40.

Switch 240 actuated by actuating element 244 extending into the guide path for the suspension elements, controls the movement of rocker lever 230 by actuating lever drive LD.

Figure 6:
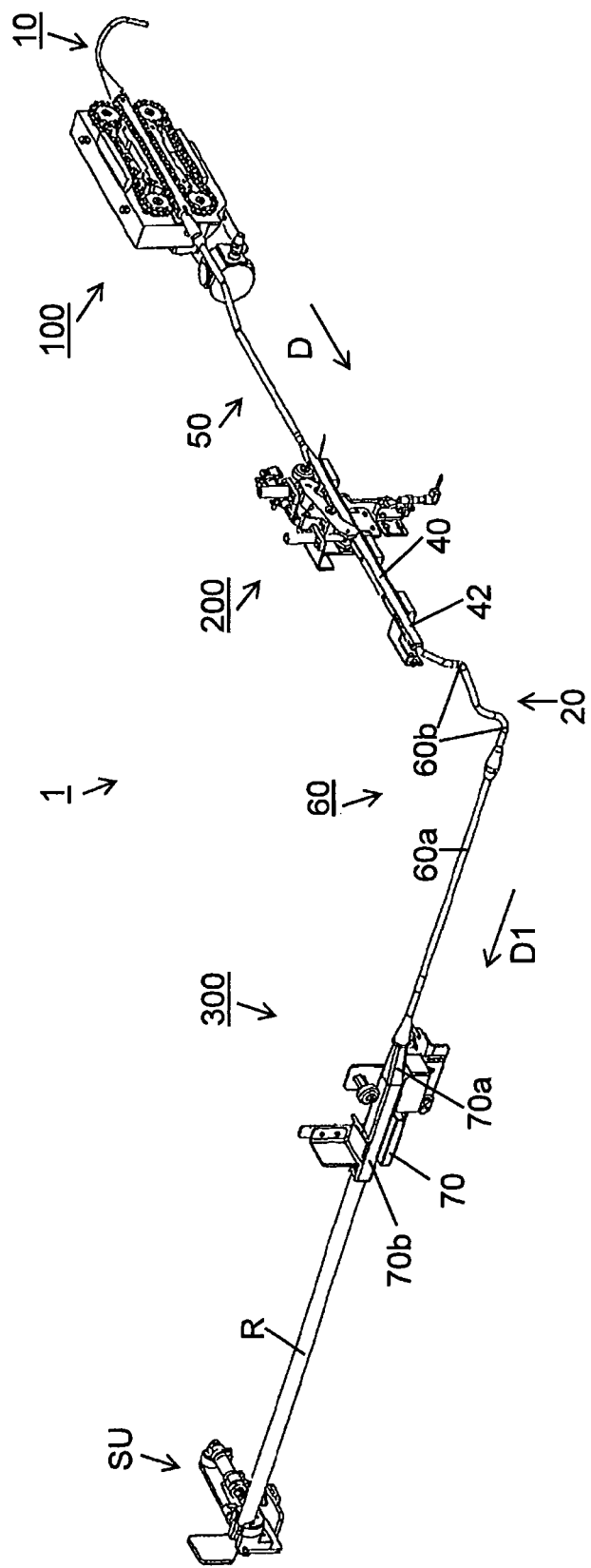
FIG. 6 is a perspective and schematic view of a second embodiment of a guide device according to the present invention.

FIG. 6 is a perspective and schematically view of a second embodiment of guide device 1 according to the present invention.

The second embodiment of guide device 1 is designed similar to the first embodiment of guide device 1 according to FIG. 1, and comprises a guide unit 20, a first support unit 100 and a second support unit 200. A catching device 10 is attached to the free end of guide unit 20, The second embodiment of guide device 1 additionally comprises a third support unit 300, and guide unit 20 comprises additional guide means including connecting rods 60 and a third guide portion 70 having a first end 70a and a second end 70b.

Connecting rods 60 connect second end 40b of second guide portion 40 to first end 70a of third guide portion 70.

Connecting rods 60 comprise a straight portion 60a and angled portions 60b. Straight portion 60a is approximately horizontally arranged and in a second guide direction D1, which is aligned approximately rectangular to guide direction D. Angled portions 60b connect second end 40b of second guide portion 40 to straight portion 60a of connecting rods 60, thereby forming a step for bridging a difference in height between second and third support units 200, 300.

As it further can be seen in FIG. 6, a rod-shaped handling element R, like a storage rod or a smoking rod, having a first end and a second end, is arranged at second end of third guide portion 70 by its first end, and axially aligned with straight portion 60a of connecting rods 60. The second end of rod-shaped element R facing in guiding direction D1, is supported by a support unit SU of the handling device.

Figure 7:
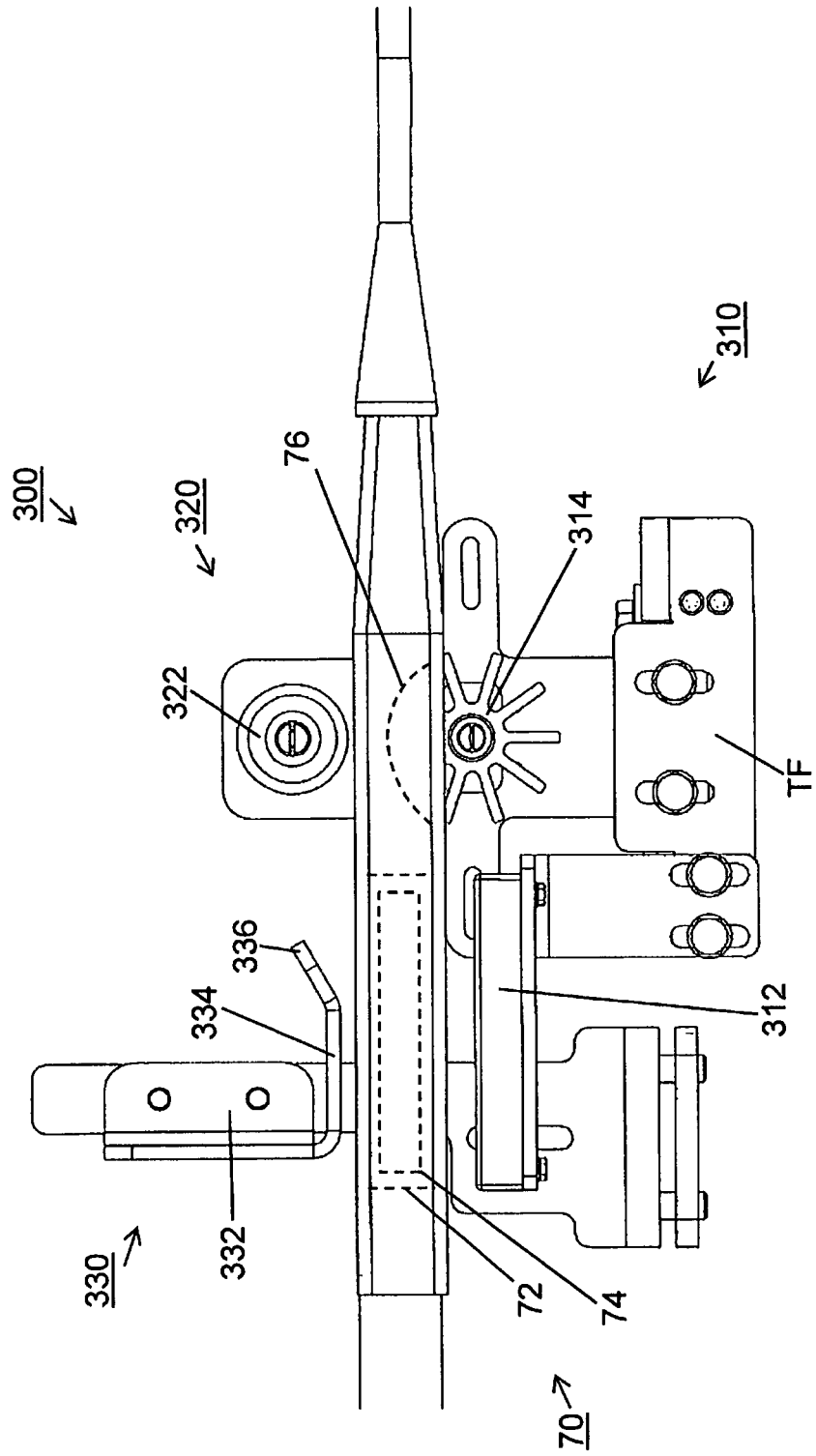
FIG. 7 is a schematic view of the third support unit of the second embodiment of the guide device according to FIG. 6.

FIG. 7 is a schematically view of third support unit 300 according to the second embodiment of the second embodiment of guide device 1.

Third support unit 300 comprises a lower supporting arrangement 310 and an upper supporting arrangement 320.

Lower supporting assembly 310 includes a horizontally arranged spacer element 312 which is coupled to a third frame work TF carrying third support unit 300. Lower supporting assembly 310 further includes a sprocket wheel 314 which is vertically arranged with a horizontal rotation axis aligned rectangular to second guide direction D1.

Upper supporting assembly 320 comprises a support element 322 in the form of a support wheel. Support element or support wheel 322 is arranged vertically above sprocket wheel 314.

Third guide portion 70 is arranged horizontally between lower and upper supporting assembly 310, 320, with second end 70b facing in second guide direction D1. Similar to first and second guide portions 30, 40, third guide portion 70 comprises a recess 72 (shown in dotted lines) in which a spacer element 74 (shown in dotted lines) is accommodated, which may be a permanent magnetic element. For co-acting with spacer element 312 of lower supporting assembly 310, for vertically supporting third guide portion 70, spacer element 74 of third guide portion 70 is arranged vertically above spacer element 312 of lower supporting assembly 310.

Third guide portion 70 further includes an at least approximately semicircular recess 76 arranged in its lower surface and extending upwardly. Semicircular recess 76 matches the diameter of and coincides with sprocket wheel 314, which engages recess 76, for laterally supporting third guide portion 70. Sprocket wheel 314 is rotatable supported for enabling passage of a suspension element guided along third guide portion 70.

Third support unit 200 further comprises a guide arrangement 330 including a guide plate 332. Guide plate 332 has a first horizontal portion 324 arranged parallel to and above third guide portion 70, and an angled portion 336 extending from first portion 334 in a direction contrary to second guide direction D1, and is angled upwardly, for enabling a suspension element guided along third guide portion 70, engaging the guide channel formed between third guide portion 70 and first portion 334 of guide arrangement 330.

It has to be understood that guide device 1, even if not shown, comprises a control unit which adjusts and controls the functions of the support units 100, 200, 300, and in particular their drives, if present, to each other and to the clipping machine, and the handling device, respectively. Alternatively, the components of guide device 1 may also be controlled by the control unit of the clipping machine to which guide device 1 is coupled.

In the production of sausage-shaped products, filling material is fed into a tubular packaging material which is closed by a closure means, like a closure clip, when a predetermined portion of filling material has been fed. Together with said clip, a suspension element, like a suspension loop, is fixed to the respective end of the sausage-shaped product. While feeding said suspension loop to the closing tools and the closure clip, respectively, said suspension loop is caught by catching device 10 which engages the suspension loop. The sausage-shaped product is placed on a conveyor for being discharged from the clipping machine. The suspension loop caught by catching device 10, is guided along guide device 1, for being guided to a handling device, where it may be placed on a rod-shaped handling element, like a smoking rod.

After the suspension element or suspension loop, has been caught by catching device 10, the suspension loop is guided along guide means 30 of guide unit 20, thereby passing first support unit 100. The suspension loop which conventionally consists of a string-like fabric is engaged by first and second endless conveyor elements 122, 142 of first and second chain conveyors 110, 140, and conveyed through first support unit 100. First and second chain conveyors 110, 140 conventionally are driven at a constant speed. Depending on the production speed, or in order to provide a product buffer, the speed of first and second chain conveyors 110, 140 may vary, controlled by a control unit.

The suspension element thereafter arrives at second support unit 200, and is guided along second guide portion 40 through second support unit 200. When entering second support unit 200, rocker lever 320 is in the first position shown in FIG. 1. The suspension element guided along second guide portion 40, and in particular its lower portion being guided below guide means 20, engages actuating element 244 of switch 240, effecting the pivot movement of rocker lever 230 from the first position into the second position. When pivoting in clockwise direction into the second position, rocker lever 230 moves first support pin 222 downwardly into the respective hole 46 in second guide portion 40, arranged vertically below first support pin 222. At the same time, second support pin 224 is moved upwards, leaving hole 46 of second guide portion 40, enabling passage of the suspension element, and in particular, its upper portion guided along the upper surface of guide means 20. The lower portion of the suspension element may pass second support unit 200 without any further barrier, since spacer element 212, 214, 216; 44 provide a contactless support of second guide portion 40 above lower supporting assembly 210.

It has to be understood that actuating element 244 is arrange downstream first support pin 222, in order to actuate lever drive LD after the suspension element has passed first support pin 222. Alternatively, switch 240 may act with a time delay. In this case, actuating element 244 may be arranged at any suitable position along the guide means, dependent on the delay value.

The suspension element, after being guided along connecting rods 60, enters third support unit 300 and is guided via third guide portion 70 onto rod-shaped element R. In third support unit 300, the suspension element, and in particular the lower portion guided below third guide portion 70, enters the space between two subsequent sprockets of sprocket wheel 314. During rotation of sprocket wheel 314 counterclockwise, the suspension element passes sprocket wheel 314. The suspension element further passes the passage below third guide portion 70 in the region of spacer elements 74, 312 which provide a contactless support of third guide portion 70 above lower supporting assembly 310 of third support unit 300.

The first and second embodiments of guide device 1 include a catching device 10, enabling guide device 1 for being used to discharge sausage-shaped products from a clipping machine. According to the second embodiment of guide device 1, a handling device including a rod-shaped element R, is coupled to guide device 1 for accommodating the suspension elements guided thereto by guide device 1.

Naturally, guide device 1 not necessarily comprises a catching device 10. Any other element may be coupled to guide device 1 for providing a suspension element to guide device 1. Also, any other handling device, like a further transportation device, may be coupled to guide device 1, which may be provided with products including a suspension element.

In the first support unit, chain conveyors are used as first and second conveyor means. Naturally any other kind of conveyor means may be used, which provide a safe and accurate support of the first guide portion, like a belt conveyor.

The second support unit is described as comprising magnetic spacer elements. The spacer elements may also be realized by other elements or principals. In an alternative embodiment, the spacer elements may comprise nozzles, via which a fluid flow may be generated, carrying the second guide portion. Particular, pressurized air may be directed from below to respective contact or counter elements in the second guide portion, for providing a contactless support.

In some cases, only one pair of spacer elements may provide sufficient support for the guide unit. Alternatively, more than one or the three shown pairs of spacer elements may be provided. Generally, the number of spacer elements may be chosen dependent on the size of the guide unit to be supported or the size and/or kind of the suspension elements or products.

It has also to be understood that the size of the passage between the lower supporting unit and the second or third guide portion may be varied by selecting spacer elements with respective features, like the appropriate magnetic strength.

The guide device according to the present invention may be used for guiding a suspension element, like a loop, being attached to one end of a sausage-shaped product, like a sausage. The inventive guide device may be a part of a guide device for discharging sausage-shaped products out of a clipping machine. In this case, it has to be understood that a conveyor may be positioned laterally along the guide device, for carrying and transporting the body of the sausage-shaped product in the guide direction. The conveyor carrying the body of the sausage-shaped product, thereby also conveys or drives, respectively, the suspension element being attached to the body of the sausage-shaped product, along the guide device.

What is claimed is:

1. A guide device for guiding a suspension element being attached to one end of a sausage-shaped product, like a sausage, from a first apparatus for producing sausage-shaped products in a guide direction to a second apparatus for handling said sausage-shaped products, the guide device comprises:
   a guide unit for guiding the suspension element, and
   support means for radially and axially supporting the guide unit, wherein the support means comprise a first support unit and a second support unit for a functional separation of the axial support and the radial support of the guide unit.

2. The guide device according to claim 1,
wherein the guide unit comprises at least one longitudinally extending guide means including at least a first guide portion, and
wherein the first support unit comprises at least first conveyor means for engaging at least the first guide portion of the guide means to radially support the guide unit.

3. The guide device according to claim 2,
wherein the first conveyor means comprise at least an endless conveyor element extending longitudinally in the guide direction and supporting the first guide portion of the guide means by its load strand.

4. The guide device according to claim 3,
wherein the first guide portion of the guide means has at least partially a concave shape, and
wherein the load strand of the endless conveyor element of the first conveyor means at least partially extends along a corresponding convex curve for engaging the first guide portion of the guide means.

5. The guide device according to claim 4,
wherein the endless conveyor element of the first conveyor means has at least a groove or notch extending along its outer surface at least approximately in the guide direction, and
wherein the first guide portion of the guide means comprises a matching notch or groove extending along the surface facing towards the endless conveyor element of the first conveyor means.

6. The guide device according to claim 2,
wherein the first support unit includes second conveyor means being arranged opposite to the first conveyor means, and comprising at least an endless conveyor element extending longitudinally in the guide direction and supporting the first guide portion of the guide means by its load strand.

7. The guide device according to claim 6,
wherein the first guide portion of the guide means has at least partially a concave shape, and
wherein the load strand of the endless conveyor element of the second conveyor means at least partially extends along a corresponding convex curve for engaging the first guide portion of the guide means.

8. The guide device according to claim 7,
wherein the endless conveyor element of the second conveyor means has at least a groove or notch extending along its outer surface at least approximately in the guide direction, and
wherein the first guide portion of the guide means comprises a matching notch or groove extending along the surface facing towards the endless conveyor element of the second conveyor means.

9. The guide device according to claim 1,
wherein the second support unit for axially supporting the guide unit is positioned spaced apart from the first support unit.

10. The guide device according to claim 9,
wherein the guide means comprise at least a second guide portion, and
wherein the second support unit comprises at least a first supporting assembly including at least one supporting element which engages the second guide portion of the guide means.

11. The guide device according to claim 10,
wherein the first supporting assembly includes a second supporting element positioned spaced apart from the first supporting element in the guide direction, which engages the second guide portion of the guide means.

12. The guide device according to claim 11,
wherein the second support unit comprises a second supporting assembly positioned opposite to the first supporting assembly and including at least one spacer element, and
wherein the second guide portion of the guide means includes at least one spacer element co-acting with the at least one spacer element of the second supporting assembly, for keeping the second guide portion of the guide means spaced apart from the second supporting assembly.

13. The guide device according to claim 11,
wherein the first supporting assembly comprises a rocker lever coupled to the first and the second supporting element, for alternately driving the first and the second supporting element.

14. The guide device according to claim 13,
wherein the second support unit comprises a switch for actuating the rocker lever.

15. The guide device according to claim 10,
wherein the first supporting assembly is positioned at least approximately perpendicular to the guide direction and spaced apart from the second guide portion of the guide means.

16. The guide device according to claim 15,
wherein the second support unit comprises a second supporting assembly positioned opposite to the first supporting assembly and including at least one spacer element, and
wherein the second guide portion of the guide means includes at least one spacer element co-acting with the at least one spacer element of the second supporting assembly, for keeping the second guide portion of the guide means spaced apart from the second supporting assembly.

17. The guide device according to claim 10,
wherein the second support unit comprises a second supporting assembly positioned opposite to the first supporting assembly and including at least one spacer element, and
wherein the second guide portion of the guide means includes at least one spacer element co-acting with the at least one spacer element of the second supporting assembly, for keeping the second guide portion of the guide means spaced apart from the second supporting assembly.

18. The guide device according to claim 9,
wherein the second support unit comprises a second supporting assembly positioned opposite to the first supporting assembly and including at least one spacer element, and
wherein the second guide portion of the guide means includes at least one spacer element co-acting with the at least one spacer element of the second supporting assembly, for keeping the second guide portion of the guide means spaced apart from the second supporting assembly.

19. The guide device according to claim 18,
wherein the at least one spacer element of the second supporting assembly and the at least one spacer element of the second guide portion of the guide means are magnetic elements having contrarily directed polarity.

20. The guide device according to claim 1,
wherein a third support unit is provided spaced apart from the first and second support units in the guide direction, and wherein the third support unit includes at least one spacer element co-acting with a further spacer element of a third guide portion of the guide means.

\* \* \* \* \*

UNITED STATES PATENT AND TRADEMARK OFFICE
CERTIFICATE OF CORRECTION

PATENT NO. : 9,706,780 B2  Page 1 of 1
APPLICATION NO. : 14/808212
DATED : July 18, 2017
INVENTOR(S) : Manfred Waldstädt et al.

It is certified that error appears in the above-identified patent and that said Letters Patent is hereby corrected as shown below:

In the Claims

Claim 1, Column 14, Line 60-61, delete "product, like a sausage," and insert -- product --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*